United States Patent

Byrne et al.

[11] 4,115,723
[45] Sep. 19, 1978

[54] CONTROL CIRCUIT FOR VEHICLE COMPARTMENT LIGHT

[75] Inventors: James C. Byrne, Farmington Hills; Dennis D. Talmage, Canton, both of Mich.

[73] Assignee: Gulf & Western Manufacturing Company, Southfield, Mich.

[21] Appl. No.: 817,703

[22] Filed: Jul. 21, 1977

[51] Int. Cl.² .............................................. B60Q 7/00
[52] U.S. Cl. ................................ 315/84; 307/10 LS; 315/77; 315/360; 362/80
[58] Field of Search ................ 315/82, 83, 84, 360, 315/362, 77; 307/10 R, 10 LS; 362/74, 80, 182

[56] References Cited

U.S. PATENT DOCUMENTS

| | | | |
|---|---|---|---|
| 3,221,211 | 11/1965 | Murphy | 315/84 |
| 3,530,333 | 9/1970 | Roberts | 315/83 |
| 3,546,527 | 12/1970 | Chunn et al. | 315/82 |
| 3,701,904 | 10/1972 | Gardner | 307/10 BP |
| 3,798,500 | 3/1974 | Florence et al. | 315/82 |
| 3,916,250 | 10/1975 | Brock et al. | 315/84 |
| 3,993,914 | 11/1976 | Conrad et al. | 307/10 LS |
| 4,071,805 | 1/1978 | Brock | 315/84 |

Primary Examiner—Saxfield Chatmon, Jr.
Attorney, Agent, or Firm—Meyer, Tilberry & Body

[57] ABSTRACT

A control circuit for controlling the compartment or dome light of a vehicle whereby the dome light remains on after one of the door handle buttons has been depressed. This circuit includes means for retaining a fixed timing function, irrespective of the time the door is opened. Also, the circuit includes means for deactivating the operating circuit during steady state conditions whereby the amount of energy dissipated by the circuit is minimized.

29 Claims, 1 Drawing Figure

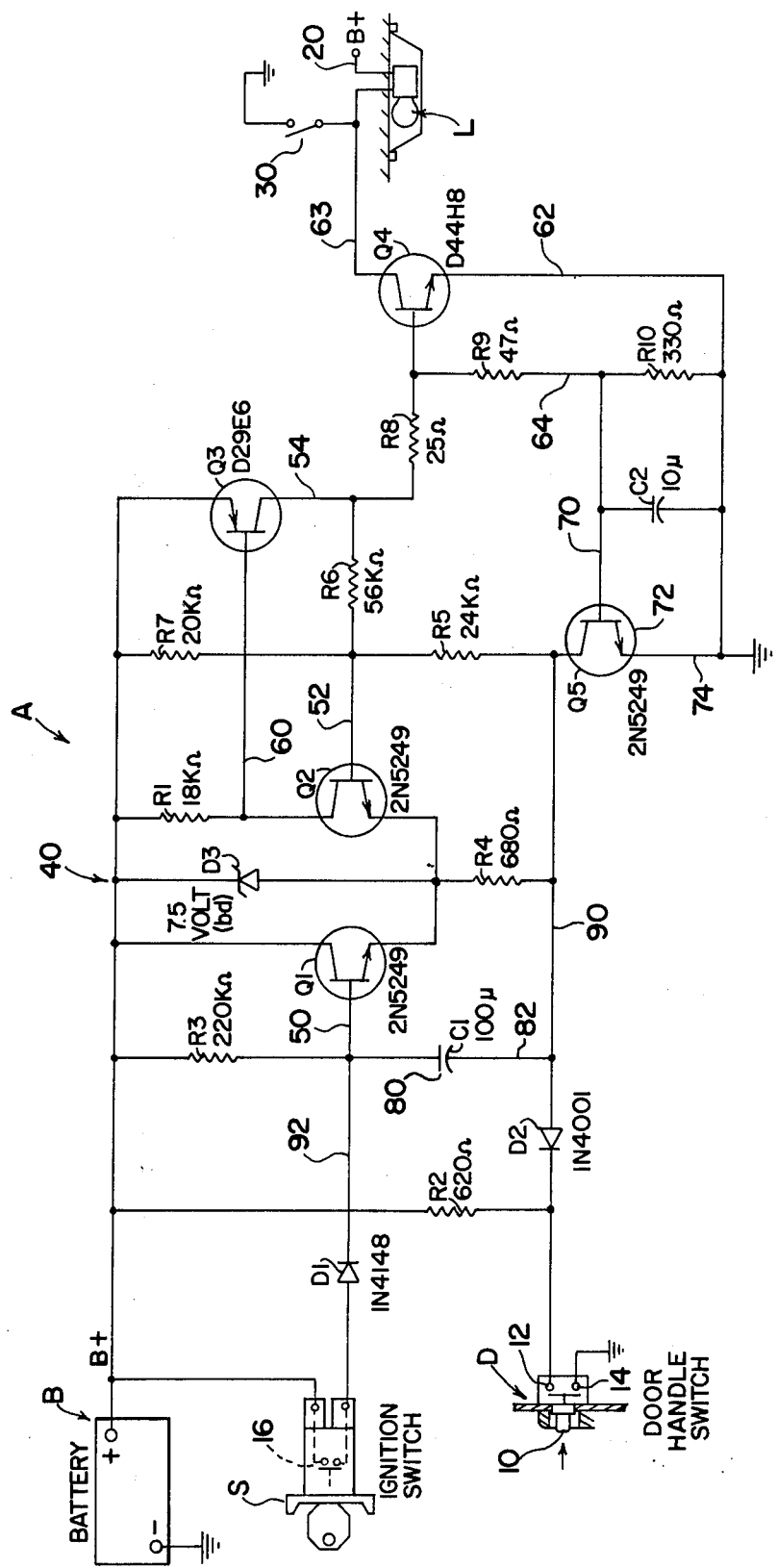

CONTROL CIRCUIT FOR VEHICLE COMPARTMENT LIGHT

This invention relates to the art of control circuits for compartment or dome lights of a motor vehicle and more particularly to a control circuit which has novel operating characteristics and properties.

BACKGROUND OF INVENTION

Passenger vehicles generally include a compartment or dome light which is illuminated when the vehicle door is opened and extinguished when the vehicle door is closed. A manual switch within the vehicle can illuminate the compartment or dome light when the vehicle door is closed. Recently, it has become somewhat common practice to provide a time delay feature for the dome light. As the door is closed, the dome light, which may include more than one simultaneously operated light, remains on for a preselected time. At first, these time delay devices employed relay or other mechanical contact circuits which required periodic maintenance and had to be replaced in some instances due to corrosion of the contacts and other deteriorating conditions. Since these systems control the dome light or lights, their deterioration often involves incapacitating the dome light itself which can be annoying and defeats the purpose of the time delay feature. To overcome the disadvantages of relay systems for controlling the time delay of the compartment or dome light operation, solid state timing circuits have been developed. These solid state timing circuits have often involved only a conversion of the basic relay circuitry into solid state components. Such systems have been used successfully; however, there is always a need from both a sales standpoint and a safety and convenience standpoint to provide improved circuitry for controlling the compartment or dome light or lights in a manner more concomitant with the actual needs of a passenger operating the vehicle.

In prior time delay circuits for controlling compartment or dome lights, the light remains illuminated for a preselected time following closing of the vehicle door. This may be desired in certain instances; however, if the door remains opened for a prolonged time, which can happen easily easily during daylight hours, there can be a substantial drain on the battery of the vehicle. In addition, most prior time delay circuits for controlling the compartment light, whether an electro-mechanical system or a solid state circuit, have required dissipation of at least substantial energy during steady state conditions. With the present amount of energy being required to operate a vehicle, this drain of energy is not desirable. In addition, this power consumption can cause a reduction in the overall life of the control circuit.

THE PRESENT INVENTION

The present invention relates to an improved control circuit for controlling the illuminated period of a compartment or dome light or lights in a manner to protect against prolonged illumination periods due to the door being opened and to reduce the total amount of energy consumed, especially in the steady state or normal condition. This reduces the heat which must be dissipated by the system and conserves energy and prolongs life of the system. Also, the unit is light and small.

In accordance with the invention, there is provided an improved control circuit for the compartment or dome light or lights of a motor vehicle, which control system includes an operating circuit having a voltage responsive input, an output, means for creating a first output condition extinguishing the dome light when the input receives a voltage exceeding a given value, means for creating a second output condition illuminating the light whenever the input receives a voltage not exceeding the preselected value and switching means for switching the operating circuit between a first, or steady state, condition with the operating circuit electrically floating and a second, or timing, condition with the operating circuit connected across a substantial or operating voltage differential. A capacitor is used to control the voltage on the input. This capacitor is discharged when the door handle switch is depressed. Thereafter, the switching means shifts to the timing function, which charges the capacitor to determine the time during which the dome light is illuminated. After this time, the capacitor exceeds the preselected value, which turns off the dome light and shifts the switching means to the steady state condition. In this manner, the switching means disconnects the general operating circuit of the control circuit during steady state conditions and allows the control circuit to float in an inoperative, but ready, condition. In accordance with this aspect of the invention, the light is non-illuminated when the switching means is in its steady state condition. By using this aspect of the invention, the energy dissipated by the system during the steady state or normal conditions is substantially reduced.

In accordance with another aspect of the invention there is provided a control circuit wherein the timing function is independent of operation of the door. When one of the door handle buttons is depressed, the timing function is started and times out in a given time irrespective of the door position. By using this aspect of the invention, which provides a latching system for the timing function, the light remains on only for a preselected time after depressing the door operating button. This avoids the situation where the door remains open inadvertently for a prolonged time which can drain the battery of the vehicle. To again start timing cycle, one of the door operating buttons is depressed.

In accordance with another aspect of the invention, the latching arrangement for the timing function is combined with the switching means that controls the shifting of the circuit between the steady state condition and the timing condition.

The primary object of the present invention is the provision of a control circuit for controlling the illumination of a compartment or dome light or lights in a motor vehicle, which control circuit is solid state, may be made in a single module plugged into the vehicle, is silent in operation, requires no maintenance, dissipates a substantially reduced amount of energy, and prevents inadvertent discharge of the battery due to prolonged periods of the vehicle door being opened.

Another object of the present invention is the provision of a control circuit of the type described above, which control circuit is somewhat inexpensive, can be used in various vehicles, and includes a timing latch together with a power conserving selective switching arrangement.

These and other objects and advantages will become apparent from the following description which is presented for illustrative purposes only.

BRIEF DESCRIPTION OF DRAWING

The single drawing is a combined schematic and wiring diagram illustrating the preferred embodiment of the present invention and containing components which include their parameters as used in the preferred embodiment.

PREFERRED EMBODIMENT

Referring now to the drawing wherein the showing is for the purpose of illustrating the preferred embodiment only and not for the purpose of limiting same, control circuit A is used in a vehicle including a battery B of the type have a fixed B+ voltage, such as 12 volts D.C. A door handle switch D is mounted on the door so that depression of door handle button or plunger 10 closes contacts 12, 14. The various doors may include a switch D in parallel so that each of the doors will operate circuit A. An ignition switch S is of the type which includes an internal operating switch 16 which is closed when the vehicle is being operated. This switch is associated with the vehicle ignition switch and is generally the first or second switch position preparatory to starting of the engine. System A is used to control the illumination and non-illumination condition of the compartment or dome light L of the type being connected by line 20 to the battery voltage. A manual overriding switch 30 can manually shift light L on according to the position of the switch. This circuit is in parallel with control circuit A and does not form a part thereof. Other overriding arrangements could be provided for selectively illuminating light L.

Control circuit A includes an operating circuit 40 in the form of a differential amplifier formed by transistors Q1, Q2 and having a control input 50, a biasing input 52 and an output 54 which is controlled by output transistor Q3. To appreciate the operating characteristics of the differential amplifier 40 and the manner by which this circuit controls light L, it can first be assumed that circuit 40 is connected across a substantial voltage differential, i.e. the B+ voltage to the chassis ground. This situation is not provided during a steady state condition of circuit A. Making this assumption, if input transistor Q1 is off because the voltage at input 50 is below a preselected given level in a given polarity direction, transistor Q2 will be on. Resistor R1 controls saturation of transistor Q2 and provides a current limiting feature. With transistor Q2 conducting, base current is provided through line 60 to the base of output transistor Q3. This connects output 54 to the B+ voltage and provides base current through resistor R8 and forward biases control transistor Q4. Lines 62, 63 then connect light L to chassis ground and illuminates the light. At the same time, line 64 provides a voltage divider using resistors R8, R9 and R10 to control the voltage on base line 70 of switching means 72, which is transistor Q5. This switching means has base current and is forward biased in a manner to connect transistor Q5 to chassis ground by line 74. This then grounds operating circuit 40 and applies it across a substantial voltage differential between B+ and chassis ground. This was the assumption made previously and it holds true since transistor Q5 is on. Consequently, as long as latching or switching transistor Q5 is on the operating circuit 40 is connected across a substantial voltage differential and is in the timing mode with the light illuminated.

Assuming now that the voltage at input 50 exceeds a voltage determined by the voltage divider formed from resistors R5, R7, transistor Q1 is then conducting. This turns transistor Q2 off the differential amplifier off and prevents forward biasing of transistor Q3. Thus, transistor Q3 is off to prevent operation of transistors Q4 and Q5. When the switching device 72 formed by transistor Q5 is off, circuit 40 floats at approximately the B+ voltage in a steady state or normal condition.

As previously described, the voltage on input 50 during at least the timing function controls the illumination of light L. To control the voltage on the input, there is provided a capacitor C1 having electrodes 80, 82 and connected in electrical series with charging resistor R3 and line 90. Line 90 is communicated with door handle switch D through diode D2, which is biased by resistor R2 during at least the timing function, as will be explained later. To complete circuit A, operating switch 16 in ignition switch S is connected by line 92 through a diode D1 to the base or input 50 of operating circuit 40.

The operation of control circuit A can best be appreciated by first assuming that the control circuit is in the steady state or normal condition and has been in this condition a sufficient time so that capacitor C1 has been discharged by transistor Q1 and resistors R3, R4 to below the threshold voltage of input 50. In this condition, switching device 72 is off and the circuit is primarily floating near the B+ voltage of battery B which, in the illustrated embodiment is approximately 12 volts D.C. In this condition, very little energy is being dissipated by the control circuit. Transistors Q1, Q2, Q3, Q4 and Q5 are all non-conducting. Light L is off.

Assuming now that plunger 10 is depressed. This immediately shifts line 90 to the chassis ground through contacts 12, 14. Since capacitor C1 is discharged, input 50 is approximately at chassis ground. Current flow through resistor R4 starts transistor Q2 toward its conducting state. This commences base current to transistor Q3 which increases the voltage on output 54. This action is substantially instantaneous. The resistor R6 forms a hard saturating feedback arrangement so that as soon as transistor Q3 starts its conducting state, a feedback of current is directed to the biasing input 52 of the differential amplifier. This rapidly turns transistor Q2 on, which in turn, rapidly turns on transistor Q3. The feedback also works in the non-conducting transition by reducing the current flow to the base of transistor Q2 through resistor R6. With transistor Q3 conducting, transistor Q4 is immediately turned on to illuminate light L. At the same time, line 70 provides base current for transistor Q5. Consequently, line 90 is immediately connected to line 74 through switching device 72 and provides a latching circuit around switch D. Thus, the condition of switch D is no longer instrumental in the timing function. When switch D is released, a positive voltage is applied through resistor R2 for preventing leakage through diode D2 although there may be some tendency of providing current leakage through switch D. With switching device 72 conducting, system A is in timing condition or mode and is independent of switch D. A time constant means, including resistor R3 and switching means 72, charges capacitor C1 toward the B+ voltage at a preselected rate. As soon as this voltage reaches a preselected level input 50 starts the conduction of transistor Q1. Transistor Q2 in the differential amplifier is then turned off. As previously indicated, this will turn off transistors Q3 and Q4 and extinguish light L. At the same time, base current is removed from switching device 72 and it is also turned off. Consequently, as soon as capacitor C1 charges to a preselected or threshold voltage level, light L is extinguished irrespective of the position of switch D. If the plunger of switch D has been released after the timing function started, control circuit A then progresses to the steady state condition. The steady state condition is controlled by the non-conduction of switching means 72. In this condition, line 90 is no longer pulled to chassis ground. Since transistor Q1 is conducting, there is a discharge path for capacitor C1 through the parallel circuit including transistor Q1 and resistor R4. Resistors R5, R7 also assist in discharging the capacitor. Consequently, control circuit A stabilizes close to or generally at the B+ voltage and all transistors are off.

As can be seen, switching device 72 provides a holding circuit for latching control circuit A to an operating or timing condition until the timing function has expired. Thereafter, the system A goes into a steady state condition and settles at generally the B+ voltage of battery B.

If during the timing cycle operating switch 16 is closed by operation of ignition switch S, B+ voltage is immediately applied through diode D1 of line 92 to apply a voltage exceeding the preselected level at input 50. Thus, closing of switch 16 immediately extinguishes light L. This overrides the timing function and places the circuit into a steady state condition until door handle switch D is again depressed.

Capacitor C2 is used for preventing circuit oscillations and provides noise immunity at switching device 72. Transistor Q3 may be a standard transistor; however, in practice it is a General Electric d29E6 which is a high gain, high current small signal type of transistor. In a like manner, transistor Q4 could be standard; however, it is a General Electric D44H8 which has a low saturation and a fairly high gain. The other transistors are standard transistors, as indicated. The other components in the preferred embodiment have the parameters indicated on the drawing. Resistor $R_2$ establishes the maximum impedance of switch D in the closed condition necessary to trigger circuit A. Consequently, corrosion and other environmental contaminants will not affect operation of the system. In practice, a Zenor diode $D_3$ is connected across the differential amplifier B+ line to the emitters of transistors $Q_1$ and $Q_2$. With this arrangement an applied voltage substantially greater than B+ will cause diode $D_3$ to breakdown and forces $Q_1$ $Q_2$ off by clamping the emitters to above threshold.

Having thus defined the invention, it is claimed:

1. A control circuit for shifting a compartment light of a vehicle having a door, a control switch manually movable to an operating position upon releasing said door for opening, and an ignition switch having an actuated position and a non-actuated position, said shifting being between an illuminating condition of said light and a non-illuminating condition of said light, said control circuit including a voltage responsive input, an output, means for creating a first output condition when said input receives a voltage greater than a preselected value and a second output condition when said input receives a voltage less than said preselected given value, and switching means for shifting said operating circuit between a first, steady state condition with said operating circuit electrically floating and a second, timing condition with said operating circuit connected across a substantial voltage differential, means for holding said output at said first output condition irrespective of the voltage at said input when said operating circuit is in said steady state condition; means responsive to said first output condition for shifting said light into said non-illuminating condition and responsive to said second output condition for shifting said light into said illuminating condition; a capacitor normally discharged during said steady state condition of said operating circuit; means connecting said capacitor to said input for controlling the voltage on said input in accordance with the charged condition of said capacitor; time constant means for charging said capacitor at a given rate when actuated; means responsive to moving said control switch to said operating position for actuating said time constant means by shifting said switching means to said second, timing condition; and, means for shifting said switching means to said steady state condition in response to said capacitor being charged to a voltage applying at least said preselected given value.

2. A control circuit as defined in claim 1 including means responsive to shifting said ignition switch to said actuated position for applying a voltage greater than said preselected given value to said input.

3. A control circuit as defined in claim 2 wherein said switching means includes a conductive path to a voltage less than said preselected given value and said time constant means includes said path.

4. A control circuit as defined in claim 1 wherein said switching means includes a conductive path to a voltage less than said preselected given value and said time constant means includes said path.

5. A control circuit as defined in claim 4 wherein said operating circuit is a differential amplifier having said input, said output and a biasing input and means for applying a biasing voltage to said biasing input in response to moving of said control switch to said operating position.

6. A control circuit as defined in claim 5 including feedback means responsive to each of said output conditions for controlling current flow to said biasing input whereby the speed of shifting between said illuminating and non-illuminating conditions is increased.

7. A control circuit as defined in claim 1 wherein said operating circuit is a differential amplifier having said input, said output and a biasing input and means for applying a biasing voltage to said biasing input in response to moving of said control switch to said operating position.

8. A control circuit as defined in claim 7 including feedback means responsive to each of said output conditions for controlling current flow to said biasing input whereby the speed of shifting between said illuminating and non-illuminating conditions is increased.

9. A control circuit for shifting a compartment light of a vehicle having a door, a control switch manually movable to an operating position upon releasing said door for opening, and an ignition switch having an actuated position and a non-actuated position, said shifting being between an illuminating condition of said light and a non-illuminating condition of said light, said control circuit including a voltage responsive input, an output, means for creating a first output condition when said input receives a voltage greater than a preselected value and a second output condition when said input receives a voltage less than said preselected given value; means responsive to said first output condition for shifting said light into said non-illuminating condition and responsive to said second output condition for shifting said light into said illuminating condition; a capacitor; means connecting said capacitor to said input for controlling the voltage on said input in accordance with the charged condition of said capacitor; time constant means for charging said capacitor at a given rate when actuated; means responsive to moving said control switch to said operating position for simultaneously grounding said capacitor and actuating said time constant means; and, means for deactuating said time constant means in response to said capacitor being charged to a voltage applying at least said preselected given value whereby said light is shifted to its non-illuminated condition.

10. A control circuit as defined in claim 9 including means responsive to shifting said ignition switch to said actuated position for applying a voltage greater than said preselected given value to said input.

11. A control circuit as defined in claim 10 wherein said operating circuit is a differential amplifier having said input, said output and a biasing input and means for applying a biasing voltage to said biasing input in response to moving of said control switch to said operating position.

12. A control circuit as defined in claim 5 including feedback means responsive to each of said output conditions for controlling current flow to said biasing input whereby the speed of shifting between said illuminating and non-illuminating conditions is increased.

13. A control circuit as defined in claim 9 wherein said operating circuit is a differential amplifier having said input, said output and a biasing input and means for applying a biasing voltage to said biasing input in response to moving of said control switch to said operating position.

14. A control circuit as defined in claim 13 including feedback means responsive to each of said output conditions for controlling current flow to said biasing input whereby the speed of shifting between said illuminating and non-illuminating conditions is increased.

15. A control circuit for shifting a compartment light of a vehicle having a door, a control switch manually movable to an operating position upon releasing said door for opening, and an ignition switch having an actuated position and a non-actuated position, said shifting being between an illuminating condition of said light and a non-illuminating condition of said light, said control circuit including a voltage responsive input, an output, means for creating a first output condition when said input receives a voltage exceeding a preselected value in a given polarity direction and a second output condition when said input receives a voltage not exceeding said preselected given value in said given polarity direction; means responsive to said first output condition for shifting said light into said non-illuminating condition and responsive to said second output condition for shifting said light into said illuminating condition; a capacitor; means connecting said capacitor to said input for controlling the voltage on said input in accordance with the charged condition of said capacitor; time constant means for changing the charge on said capacitor in said given polarity direction and at a given rate when actuated; means responsive to moving said control switch to said operating position for simultaneously grounding said capacitor in a polarity direction opposite to said given polarity to a value not exceeding said preselected given value and actuating said time constant means; and, means for deactivating said time constant means in response to the charge on said capacitor being sufficient to apply at least said preselected given value in said given polarity direction whereby said light is shifted to its non-illuminating condition.

16. A control circuit as defined in claim 15 including means responsive to shifting said ignition switch to said actuated position for applying a voltage greater than said preselected given value to said input.

17. A control circuit as defined in claim 16 wherein said operating circuit is a differential amplifier having said input, said output and a biasing input and means for applying a biasing voltage to said biasing input in response to moving of said control switch to said operating position.

18. A control circuit as defined in claim 16 including feedback means responsive to each of said output conditions for controlling current flow to said biasing input whereby the speed of shifting between said illuminating and non-illuminating conditions is increased.

19. A control circuit as defined in claim 15 wherein said operating circuit is a differential amplifier having said input, said output and a biasing input and means for applying a biasing voltage to said biasing input in response to moving of said control switch to said operating position.

20. A control circuit as defined in claim 19 including feedback means responsive to each of said output conditions for controlling current flow to said biasing input whereby the speed of shifting between said illuminating and non-illuminating conditions is increased.

21. A control circuit for shifting a compartment light of a vehicle having a door, a control switch manually movable to an operating position upon releasing said door for opening, and an ignition switch having an actuated position and a non-actuated position, said shifting being between an illuminating condition of said light and a non-illuminating condition of said light, said control circuit including a voltage responsive input, an output, means for creating a first output condition when said input receives a voltage exceeding a preselected value in a given polarity direction and a second output condition when said input receives a voltage not exceeding said preselected given value in said given polarity direction, and switching means for shifting said operating circuit between a first, steady state condition with said operating circuit electrically floating and a second, timing condition with said operating circuit connected across a substantial voltage differential, means for holding said output at said first output condition irrespective of the voltage at said input when said operating circuit is in said steady state condition; means responsive to said first output condition for shifting said light into said non-illuminating condition and responsive to said second output condition for shifting said light into said illuminating condition; a capacitor; means connecting said capacitor to said input for controlling the voltage on said input in accordance with the charged condition of said capacitor; time constant means for changing the charge on said capacitor in said given polarity direction and at a given rate when actuated; means responsive to moving said control switch to said operating position for simultaneously shifting said capacitor in a polarity direction opposite to said given polarity to a value not exceeding said preselected given value and actuating said time constant means by shifting said switching means to said second, timing condition; and, means for shifting said switching means to said steady state condition at least after said light is shifted into said illuminating condition.

22. A control circuit as defined in claim 21 including means responsive to shifting said ignition switch to said actuated position for applying a voltage greater than said preselected given value to said input.

23. A control circuit as defined in claim 22 wherein said switching means includes a conductive path to a voltage less than said preselected given value in said given polarity direction and said time constant means includes said path.

24. A control circuit as defined in claim 21 wherein said switching means includes a conductive path to a voltage less than said preselected given value in said given polarity direction and said time constant means includes said path.

25. A control circuit as defined in claim 24 wherein said operating circuit is a differential amplifier having said input, said output and a biasing input and means for applying a biasing voltage to said biasing input in response to moving of said control switch to said operating position.

26. A control circuit as defined in claim 25 including feedback means responsive to each of said output conditions for controlling current flow to said biasing input whereby the speed of shifting between said illuminating and non-illuminating conditions is increased.

27. A control circuit as defined in claim 21 wherein said operating circuit is a differential amplifier having said input, said output and a biasing input and means for applying a biasing voltage to said biasing input in response to moving of said control switch to said operating position.

28. A control circuit as defined in claim 27 including feedback means responsive to each to said output conditions for controlling current flow to said biasing input whereby the speed of shifting between said illuminating and non-illuminating conditions is increased.

29. A control circuit for shifting a compartment light of a vehicle having a door, a control switch manually movable to an operating position upon releasing said door for opening, said shifting being between an illuminating condition of said light and a non-illuminating condition of said light, said control circuit including a differential amplifier having a voltage controlled input, a biasing input, an output, means for shifting said output to a first condition extinguishing said light when a voltage exceeding a preselected voltage is applied to said control input, means for shifting said output to a second condition illuminating said light when a voltage less than said preselected voltage is applied to said control input; a capacitor means for applying a voltage to said control input; and means responsive to said second output condition for connecting said differential amplifier across a substantial voltage differential.

* * * * *